UNITED STATES PATENT OFFICE.

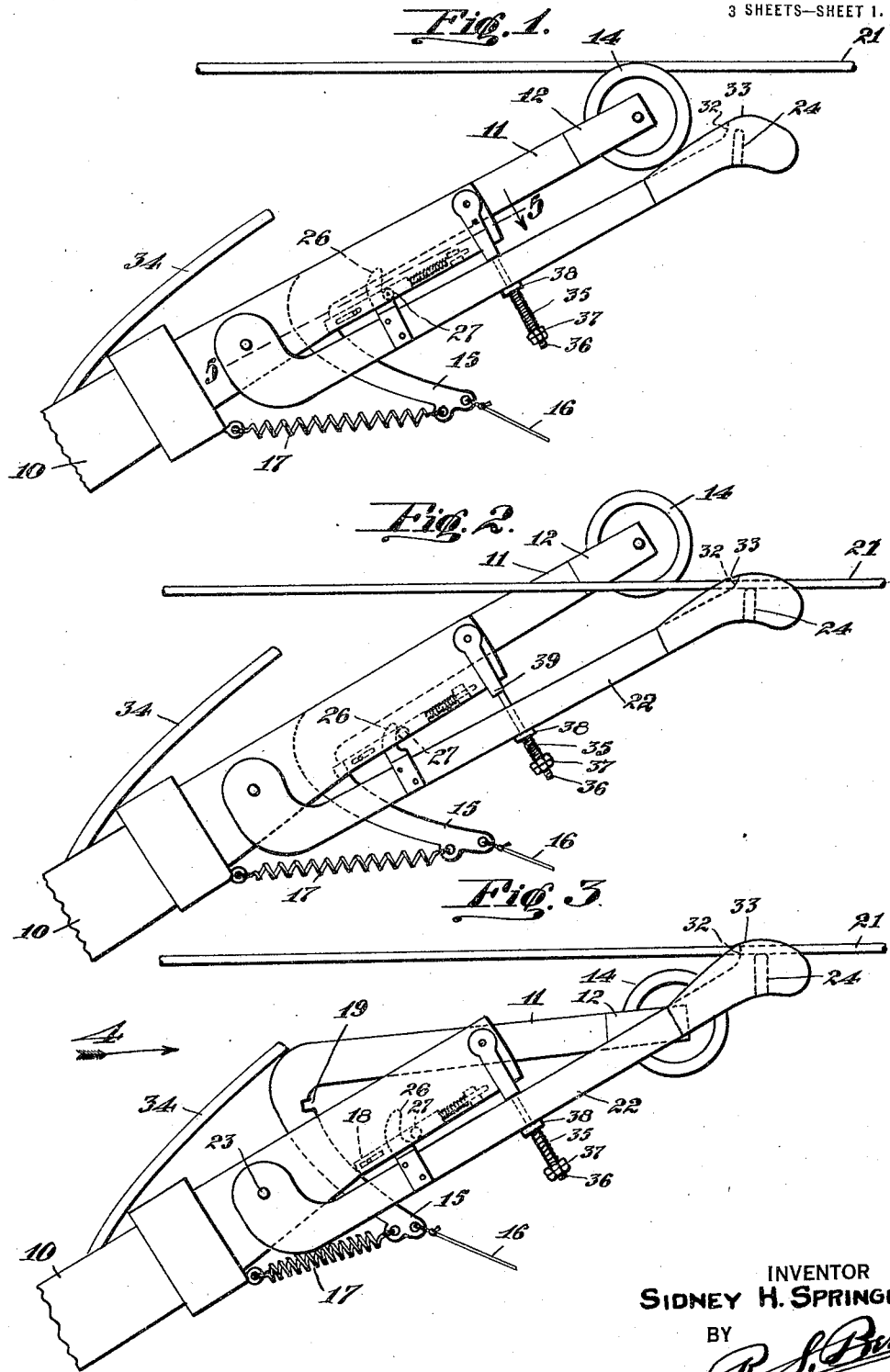

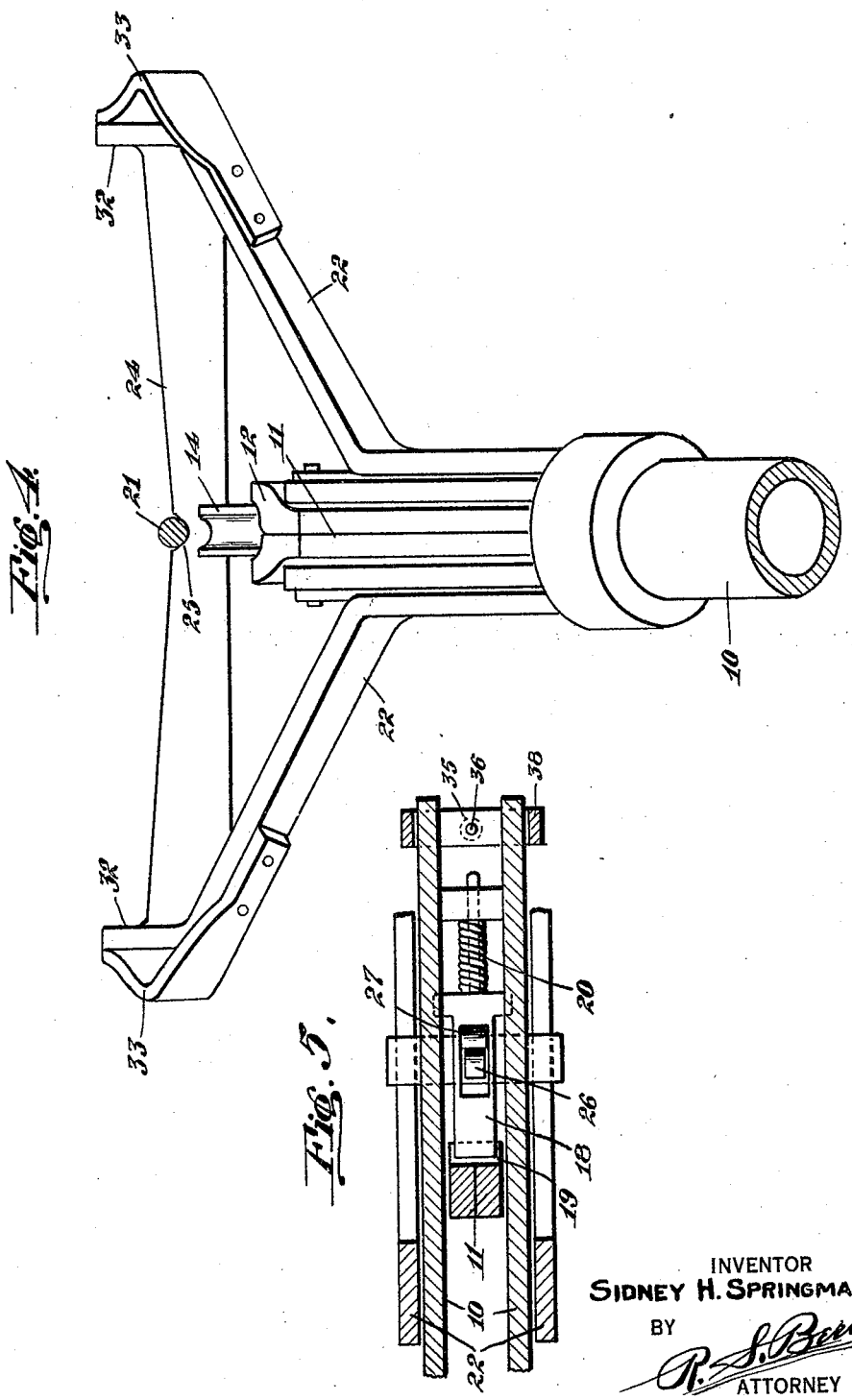

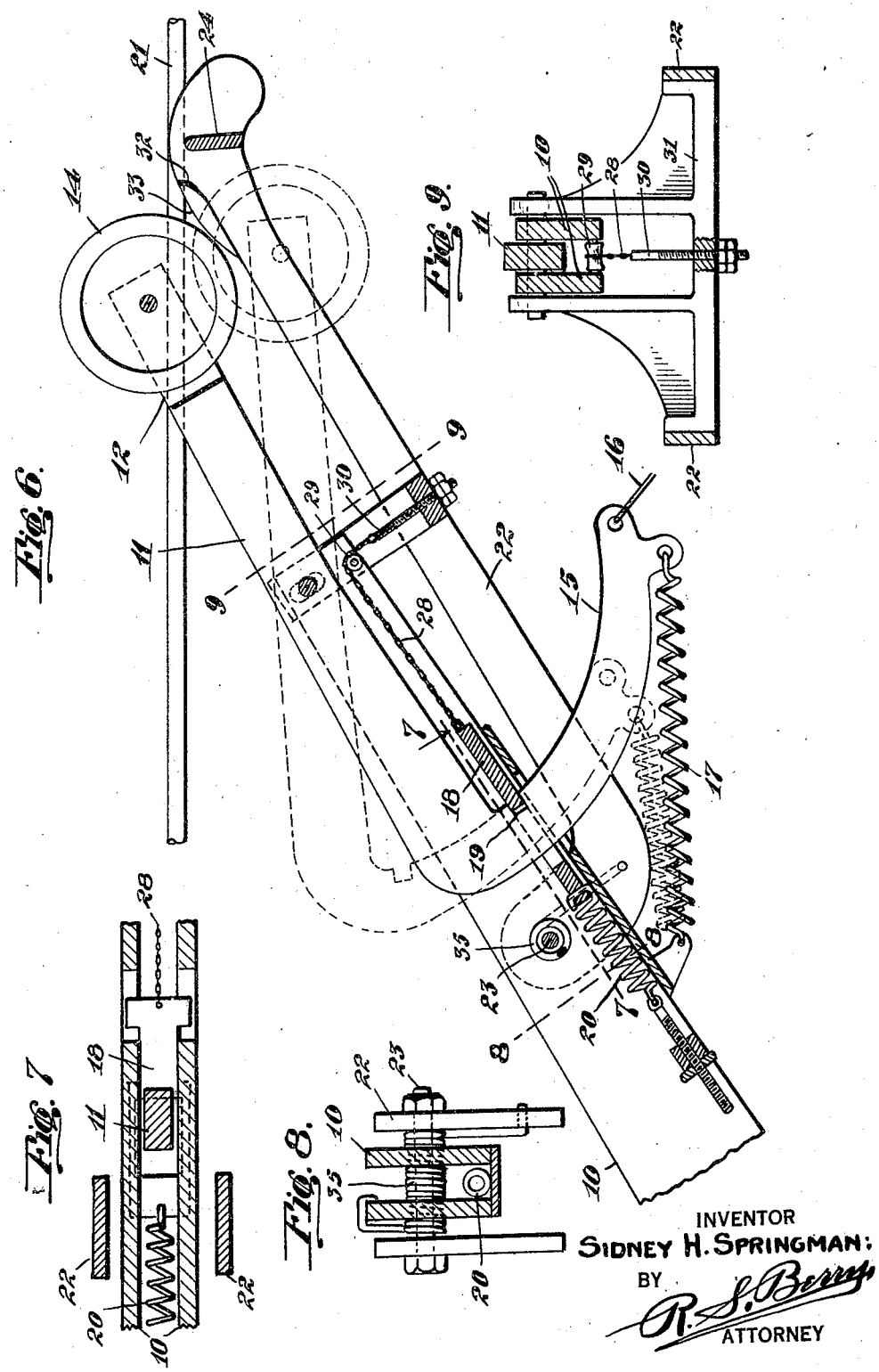

SIDNEY H. SPRINGMAN, OF TORRANCE, CALIFORNIA, ASSIGNOR OF ONE-HALF TO ROBERT EILMANN, OF LOS ANGELES, CALIFORNIA.

TROLLEY RETRIEVER.

1,405,348.  Specification of Letters Patent.  Patented Jan. 31, 1922.

Application filed April 27, 1920. Serial No. 377,028.

*To all whom it may concern:*

Be it known that I, SIDNEY H. SPRINGMAN, a citizen of the United States, residing at Torrance in the county of Los Angeles and State of California, have invented new and useful Improvements in Trolley Retrievers, of which the following is a specification.

This invention relates to a device for maintaining electrical connection between a trolley wire and trolley in event the trolley wheel should jump from the wire, and particularly pertains to trolley wheel mounting especially adapted for use in street car construction where narrow flanged trolley wheels are employed.

It is the object of this invention to provide a mounting for trolley wheels whereby the wheels will be automatically retracted in event it is thrown out of engagement with the trolley wires so as not to strike the hangers or cross wires from which the trolley wire is suspended, and another object is to provide means whereby electrical connection will be maintained between the trolley wire and the trolley wheel support when the wheel is retracted.

Another object is to provide means whereby the trolley wheel will be automatically restored to a position beneath the trolley wire while in its retracted position so that it may be readily placed in engagement with the trolley wire.

A further object is to provide a device of the above character which is simple in construction and efficient and dependable in operation.

Other objects will appear hereinafter.

The invention is illustrated in the accompanying drawings, in which:—

Figure 1 is a view of the device as seen in side elevation and illustrating it in its normal trolley wire engaging position.

Figure 2 is a view in side elevation showing the device as positioned when the trolley wheel jumps the wire and immediately before its operation.

Figure 3 is a view in side elevation showing the device with parts positioned on retraction of the trolley wheel and before restoring the latter in engagement with the trolley wire.

Figure 4 is a view in elevation as seen in the direction indicated by the arrow 4 in Figure 3 with parts removed.

Figure 5 is a detail horizontal section as seen on the line 5—5 of Figure 1.

Figure 6 is a view in vertical section and elevation showing the modified form of the invention.

Figure 7 is a detail horizontal section as seen on the line 7—7 of Figure 6.

Figure 8 is a view in vertical section as seen on the line 8—8 of Figure 6.

Figure 9 is a view in vertical section as seen on the line 9—9 of Figure 6.

More specifically, 10 indicates the outer end portion of a trolley pole on which is pivoted a rocker arm 11, the outer end of which is formed with a yoke 12 in which a trolley wheel 14 is mounted in any suitable bearings. The inner end of the rocker arm is formed with a downward extension 15 to which is attached the trolley cord 16 leading downwardly to the car on which the trolley pole is mounted and by which the trolley pole is manipulated in the usual manner. The rocker arm 11 is designed to be retained in a fixed position relative to the trolley pole by a suitable fastening means, on the release of which the rocker arm will be automatically swung to dispose the trolley wheel in a retracted position.

For the purpose of actuating the rocker arm any suitable spring operating mechanism or its equivalent may be employed, but which is here shown as comprising a spiral spring 17 affixed at one end of the extension 15 of the rocker arm and attached at its opposite end to the trolley pole in such manner as to exert a pull on the extension 15 tending to move the outer end of the rocker arm downwardly relative to the trolley pole.

The means here shown for holding the rocker arm in its fixed position in opposition to the spring 17 comprises a latch or bolt 18 mounted on the trolley pole and adapted to engage a notch 19 in the downwardly extending portion of the rocker arm. The latch is normally positioned to engage the rocker arm by means of a spring 20, which in the form of the invention shown in Figures 1 to 5 inclusive is arranged to exert a thrust on the latch, and in Figure 6 is shown as arranged to exert a pull thereon; the latch being in the form of a plate and reciprocally mounted for lengthwise movement on the trolley pole toward and away from the down-turned extension 15 of the rocker arm.

Means are provided for retracting the latch adapted to be operated automatically by mechanism actuated by impact with the trolley wire 21 on the upward movement of a trolley pole occurring when the trolley wheel jumps the wire. This means embodies a forked arm or trip lever 22 pivoted at 23 on the trolley pole and extending upwardly beyond the upper end of the latter with its spread portion extending beyond the trolley wheel and connected by a crossbar 24.

The upper edge of the crossbar is inclined downwardly from its ends towards its center, as particularly shown in Figure 4, and is formed with a notch or depression 25 at the intersection of the inclined face, which notch is disposed in alinement with the trolley wheel.

Various means may be employed for actuating the latch by the trip lever, which is shown in Figures 1 to 5 inclusive as embodying a projection 26 carried by the trip lever having an inclined face, arranged to engage a roller 27 on the latch in such manner that on downward movement of the trip lever the latch will be retracted in opposition to the spring 20; the latch actuating connection shown in Figures 6 to 9 inclusive comprising a flexible connection 28 attached at one end to the latch and at its opposite end to the trip lever 22 after passing over a direction roller 29 on the trolley pole; the connection 28 being attached to an adjustable threaded stem 30 carried by a crossbar 31 connecting the side members of the trip lever 22.

The outer ends of the side members of the trip lever 22 extend upwardly above the crossbar 24 to form stops 32 to prevent the trolley pole from swinging side ways clear of the trolley wire, when the latter is riding on the crossbar and which is particularly serviceable where the trolley wheel jumps a wire on a curve.

As a means for preventing the upwardly projecting stops 32 from engaging the cross supporting wires and to permit the trip lever passing freely thereunder, a pair of runners 33 are provided which extend from the uppermost portions of the stops 32 outwardly from the side faces of the members of the trip lever, and thence turned inwardly and sloped on their upper edges into continuation with the top face of the trip lever members; the inclined upper edges of the runners serving to carry the outer ends of the trip lever members beneath cross wires.

If desired a guard 34 may be mounted on the trolley pole 10 to extend at an incline upwardly therefrom to prevent cross wires from engaging the inner portions of the rocker arm when the latter is in its uppermost position, as shown in Figure 3.

The parts are normally disposed as shown in Figure 1, that is, with the rocker arm 11 extending in continuation of the trolley pole and held in fixed relation thereto by the catch 18 and in opposition to the spring 17, which will then be distended. The trip lever 22 will be positioned so that its upper end will extend on a plane beneath the trolley wheel, in which position it will be maintained by means of a spring 35 arranged to exert an upward pull on the lever arm relative to the trolley pole.

In the form of the invention shown in Figures 1 to 5 inclusive the spring 35 is arranged around a stem 36 to bear between an adjustable stop 37 on the stem, and a bracket 38 carried on the trip lever; the stem 37 connecting with a yoke 39 pivoted on the trolley pole.

In the form of the invention shown in Figures 6 to 9 inclusive the spring 35 is wound on the pivot pin 23 of the trip lever and has one end engaged with the trolley pole and the opposite end connected to the trip lever in such manner as to exert an upward pull on the latter.

In the operation of the invention, when the trolley wheel jumps the trolley wire the trolley pole will move upwardly under the action of a spring (not shown), with which trolley poles are commonly equipped, thereby causing the guard bar 24 to impact against the underside of the trolley wire as shown in Figure 2, thus causing the trip lever to move downwardly in opposition to the spring 35, which movement will act to draw the latch out of engagement with the rocker arm to release the latter. The spring 17 will then act on the rocker arm and cause the trolley wheel to move to a position on a plane below the trolley wire and guard bar, which latter will then bear on the guard bar as shown in Figure 3 in electrical and sliding contact therewith so that the electric current from the trolley wire may be conveyed through the trolley pole independent of the trolley wheel and thus permit continued operation of the motor actuated thereby.

The downwardly inclined upper edges of the guard bar will operate to direct the latter transversely relative to the trolley wire to bring the wire into engagement with the notch 25, and when thus positioned the trolley wheel will be disposed immediately below the trolley wire. On pulling downward on the cord 16 the rocker arm will be swung in opposition to the spring 18 and the trolley wheel moved upwardly into reengagement with the trolley wire; the rocker arm being moved to restore the latch into engagement therewith so as to lock the rocker arm in its fixed position relative to the trolley pole. The trolley pole will also be moved downwardly and the guard bar will thereby be disposed clear of the trolley wire, thus restoring the parts to their normal position as shown in Figure 1.

While I have shown and described a specific embodiment of my invention, I do not limit myself to the exact details of construction shown, but may employ such modifications and changes as come within the scope of the appended claims without departing from the spirit of the invention.

I claim:

1. In a trolley retriever, a trolley pole, a trolley wheel, a pivoted support for said wheel mounted on the trolley pole to swing vertically, means for holding said support fixed relative to the pole, and means for disengaging said support operable by impact, and means for moving said support to lower the trolley wheel on release of said support.

2. In a trolley retriever, a trolley pole, a trolley wheel, a pivoted support for said wheel mounted on the trolley pole to swing vertically, means for holding said support fixed relative to the pole, a trip lever for releasing said support, an impact bar on said lever extending transversely of the trolley wheel on a plane therebeneath, and means whereby release of said support will cause the trolley wheel to move to a plane beneath said bar.

3. In a trolley retriever, a trolley pole, a trolley wheel, a pivoted support for said wheel mounted on the trolley pole to swing vertically, means for holding said support fixed relative to the pole, a trip lever for releasing said support, an impact bar on said lever extending transversely of the trolley wheel on a plane therebeneath, means whereby release of said support will cause the trolley wheel to move to a plane beneath said bar, and means on said bar for effecting relative movement between said bar and a trolley wire bearing thereon to position the trolley wheel directly beneath the wire.

4. In a trolley retriever, a trolley pole, a pivoted vertically movable rocker arm on said pole, a trolley wheel on said arm, yieldable means for normally holding the arm to dispose the trolley wheel in a lowermost position, latch means for holding said arm fixed and dispose the trolley wheel in an uppermost position, and trips means for releasing said catch to cause the trolley wheel to move to its lowermost position.

5. In a trolley retriever, a trolley pole, a pivoted vertically movable rocker arm on said pole, a trolley wheel on said arm, yieldable means for normally holding the arm to dispose the trolley wheel in a lowermost position, latch means for holding said arm fixed and dispose the trolley wheel in an uppermost position, trip means for releasing said catch to cause the trolley wheel to move to its lowermost position, said means adapted to be operated by impact with the underside of a trolley wire, and means for automatically disposing the trolley wheel beneath the trolley wire.

6. A trolley retriever comprising the combination of a trolley pole, a rocker arm pivoted to swing vertically on said pole, a trolley wheel on the outer end of said arm, a latch engageable with said arm to hold it with its outer end in the uppermost position, a pivoted trip lever on said pole, means for yieldably holding said trip lever in an uppermost position, and means on said trip lever adapted to impact against a trolley wire to depress the trip lever, and means whereby depression of said trip lever will operate to disengage the latch from said rocker arm.

7. A trolley retriever comprising the combination of trolley pole, a rocker arm pivoted to swing vertically on said pole, a trolley wheel on the outer end of said arm, a latch engageable with said arm to hold it with its outer end in the uppermost position, a pivoted trip lever on said pole, means for yieldably holding said trip lever in an uppermost position, and a cross member on said trip lever having its upper edge inclined downwardly towards its center, said cross member adapted to impact against a trolley wire to depress the trip lever, and means whereby depression of said trip lever will operate to disengage the latch from said rocker arm.

8. In a trolley retriever, a trolley wheel, a vertically rockable support therefor, a vertically movable transverse guard, means for detachably holding said support in a position to dispose the trolley wheel on a plane above said guard, means controlled by said guard and operable on depression thereof to releasing said support holding means, and means whereby said support will be caused to rock on its release to dispose the trolley wheel on a plane beneath said guard.

9. In a trolley retriever, a trolley wheel, a vertically rockable support therefor, a vertically movable transverse guard, means for detachably holding said support in a position to dispose the trolley wheel on a plane above said guard, means controlled by said guard and operable on depression thereof to releasing said support holding means, means whereby said support will be caused to rock on its release to dispose the trolley wheel on a plane beneath said guard, said guard adapted to bear against and afford sliding electrical contact with a trolley wire, and means on said guard for slidably engaging the sides of the wire to limit sideways movement of the guide and wire relative to each other.

SIDNEY H. SPRINGMAN.